US007720594B2

(12) United States Patent
Walsh et al.

(10) Patent No.: US 7,720,594 B2
(45) Date of Patent: May 18, 2010

(54) FUEL INJECTOR CONTROL METHOD

(75) Inventors: Joseph R. Walsh, Kineton (GB); Martin A. P. Sykes, Rainham (GB); Peter G. Griffin, Maidstone (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/226,252

(22) PCT Filed: Apr. 12, 2007

(86) PCT No.: PCT/GB2007/001334

§ 371 (c)(1),
(2), (4) Date: May 26, 2009

(87) PCT Pub. No.: WO2007/116222

PCT Pub. Date: Oct. 18, 2007

(65) Prior Publication Data

US 2009/0234558 A1 Sep. 17, 2009

(30) Foreign Application Priority Data

Apr. 12, 2006 (EP) ................................ 06252022

(51) Int. Cl.
*B60T 7/12* (2006.01)
*F02B 3/00* (2006.01)

(52) U.S. Cl. ...................................... 701/105; 123/299

(58) Field of Classification Search ................ 123/299, 123/478, 480; 701/102, 103, 104, 105, 115
See application file for complete search history.

(56) References Cited

U.S. PATENT DOCUMENTS

| | | | | |
|---|---|---|---|---|
| 2002/0046731 | A1* | 4/2002 | Rueger et al. | 123/299 |
| 2003/0029417 | A1 | 2/2003 | Zimmermann et al. | |
| 2004/0084034 | A1* | 5/2004 | Huberts et al. | 123/630 |
| 2004/0084035 | A1* | 5/2004 | Newton | 123/630 |
| 2004/0085068 | A1* | 5/2004 | Zhu et al. | 324/382 |
| 2005/0235965 | A1 | 10/2005 | Rohatschek et al. | |

FOREIGN PATENT DOCUMENTS

| | | |
|---|---|---|
| DE | 102 15 629 | 10/2003 |
| EP | 1 403 495 | 3/2004 |
| EP | 1 586 760 | 10/2005 |

* cited by examiner

*Primary Examiner*—John T Kwon
(74) *Attorney, Agent, or Firm*—Thomas N. Twomey

(57) ABSTRACT

A fuel injector control method comprises determining a required separation time between a termination of an on signal associated with a first injection event and an initiation of an on signal associated with a second injection event. The method comprises calculating an overlap time between the separation time and the time to charge the piezoelectric stack to a first level; dividing the overlap time into first and second time periods as a function of the charge and discharge currents; applying the charge current to the piezoelectric stack for a charge time; and applying the discharge current to the piezoelectric stack for a discharge time so as to discharge the stack to a second level, wherein the discharge time is calculated on the basis of the second time period of the overlap time. Thus, first and second injection events are merged in a pulse mode of operation.

19 Claims, 12 Drawing Sheets

FUEL INJECTOR CONTROL METHOD

FIELD OF THE INVENTION

This invention relates to a control method for controlling operation of a fuel injector, specifically a piezoelectric fuel injector, for use in the delivery of fuel to a combustion space of an internal combustion engine. In particular, the invention relates to a method for controlling the time separation between a termination of one injection event and an initiation of a subsequent injection event.

BACKGROUND OF THE INVENTION

Piezoelectric fuel injectors are well-known for use in automotive engines and employ a piezoelectric actuator, made of a stack of piezoelectric elements arranged mechanically in series, for opening and closing an injection valve to meter fuel injected into the engine. One type of piezoelectric fuel injector is the de-energize-to-inject injector described in EP174615. The injector stack is held in a charged state during periods of non-injection, and when it is required to inject fuel the stack is de-energized. When injection is to be terminated the stack is re-charged again. In an energize-to-inject injector, operation is reversed so that charging of the stack initiates injection and discharging of the stack terminates injection.

Piezoelectric actuators, and hence fuel delivery, are controlled by an engine control module (ECM). The ECM incorporates strategies that determine the required fuelling and timing of injection pulses based on the current engine operating conditions, including torque, engine speed and operating temperature. Such strategies determine the number, size and timings of the injections and tend to be large and complicated. Furthermore, such strategies are calibrated for specific applications (i.e., specific customers and specific engines).

Strategies of this type allow for multiple injection pulses, such as pilot and post injections. Pilot injections are generally used to reduce combustion noise, and make the engine sound less like older diesel engines. Post injections are generally used in a couple of ways: close to the main injection they are used to reduce soot (this is sometimes referred to as split main); and late post injections are used for aftertreatment systems, i.e., deNOx filters and particulate traps.

Although pilot injections are used in diesel engines to reduce combustion noise, they can lead to an increase in smoke production. Minimising the separation between the pilot and main pulses can improve the smoke-noise tradeoff, i.e., achieving good noise reduction with smaller increases in smoke.

The quantity, fuelling and timing of these injection pulses is continuously variable across the engine operating range. This allows optimization of the engine operation in terms of performance, fuel economy and emissions.

The ECM selects the injector to be opened and determines when the injector is to be opened, how long it is to remain open before being closed (this is known as an injection event), and for how long the injector is to remain closed before the next injection event.

The time separation between one injection event and another, i.e., the time period between a termination (i.e., conclusion) of an electrical on signal associated with the first injection event and an initiation of an electrical on signal associated with the second injection event, is known as the demand time, and is controlled by the ECM depending on the current operating strategy (i.e., driver demands and current engine operating conditions).

Being able to control the demand time accurately is key to the flexibility of the ECM. It allows optimization in terms of engine performance, noise and other unwanted emissions, for example nitrous oxides and particulates.

In known injectors of the de-energize to inject type, the stack is charged fully to ensure that the electrical charge across the stack returns to a known level, providing a reference for the next discharge phase. As a result, there is a limit to how short the demand time can be because it is governed by the time required to charge the stack fully, the time it takes to open the injector, and the time required for the switching means controlling the injection to switch on and off as appropriate. However, in order to increase flexibility of operation it is desirable to reduce the demand time beyond the limit imposed by known injection control strategies.

SUMMARY OF THE INVENTION

According to a first aspect of the invention there is provided a control method for a fuel injector having a piezoelectric stack that is charged by means of a charge current and discharged by means of a discharge current, the fuel injector having an injector opening time, the method comprising: determining a required separation time between a termination of an electrical on signal associated with a first injection event and an initiation of an electrical on signal associated with a subsequent (i.e., second) injection event; calculating an overlap time between the required separation time and the time required to charge the piezoelectric stack to a first reference level using the charge current; dividing the overlap time into first and second time periods as a function of the charge and discharge currents; applying the charge current to the piezoelectric stack for a charge time calculated on the basis of the first time period of the overlap time; and applying the discharge current to the piezoelectric stack for a discharge time so as to discharge the stack to a second reference level, wherein the discharge time is calculated on the basis of the second time period of the overlap time, such that the first and second injection events are merged in a merging pulse mode of operation.

The present invention advantageously enables the ECM to operate with demand times between a limit set by finite hardware times and the minimum demand time previously achievable in known systems.

Preferably, the charge time is calculated by subtracting the first time period of the overlap time from the time required to charge the stack to the first reference level such that the voltage across the stack increases from a low voltage level to a high voltage level.

The discharge time is preferably calculated by subtracting the second time period of the overlap time from the time required to discharge the stack to a second reference level such that the voltage across the stack decreases from a high voltage level to a low voltage level.

Operation in the merging pulse mode may be selected depending on the overlap time. It may also be selected depending on the required separation time and/or the injector closing time.

Optionally, the method may operate in an alternative mode of operation when not operating in the merging pulse mode, the alternative mode of operation method comprising: applying the charge current to the injector piezoelectric stack for the time required to charge the injector piezoelectric stack to a first reference level; and applying the discharge current to the piezoelectric stack for the time required to discharge the piezoelectric stack to the second reference level such that the voltage across the stack decreases from a high voltage level to a low voltage level.

Preferably, the required separation time is determined using an engine control module ECM.

The overlap time may be calculated by subtracting the required separation time from the closing time, which may be calculated by adding the charge time required to charge the piezoelectric stack to the first reference level, to a dwell time that depends on at least a hardware switching time.

Preferably, the overlap time is divided in inverse proportion to charge and discharge currents to result in the first and second time periods.

Optionally, the first reference level is a fully charged level for the stack, and the second reference level is a fully discharged level for the stack.

According to a second aspect of the invention there is provided: a controller for a fuel injector comprising a piezoelectric stack that is charged by means of a charge current and discharged by means of a discharge current, the fuel injector having an injector closing time, the controller comprising: means for determining a required separation time between a termination of an electrical on signal associated with a first injection event and an initiation of an electrical on signal associated with a second injection event; means for calculating an overlap time between the required separation time and the time required to charge the piezoelectric stack to a first reference level; means for dividing the overlap time into first and second time periods as a function of the charge and discharge currents; means for applying the charge current to the piezoelectric stack for a charge time calculated on the basis of the first time period of the overlap time; and means for applying the discharge current to the piezoelectric stack for a discharge time so as to discharge the stack to a second reference level, wherein the discharge time is calculated on the basis of the second time period of the overlap time, such that the first and second injection events are merged in a merging pulse mode of operation.

Accordingly, the second aspect of the invention may take any of the optional features of the first aspect of the invention.

According to a third aspect of the invention there is provided a computer program product comprising at least one computer program software portion that, when executed in an executing environment, is operable to implement one or more of the steps of the method of the first aspect of the invention.

According to a fourth aspect of the invention there is provided a data storage medium having the or each computer software portion according to the third aspect of the invention.

According to a fifth aspect of the invention there is provided a microcomputer provided with a data storage medium according to the fourth aspect of the invention.

DETAILED DESCRIPTION OF EXEMPLARY EMBODIMENTS

Figure 1A:
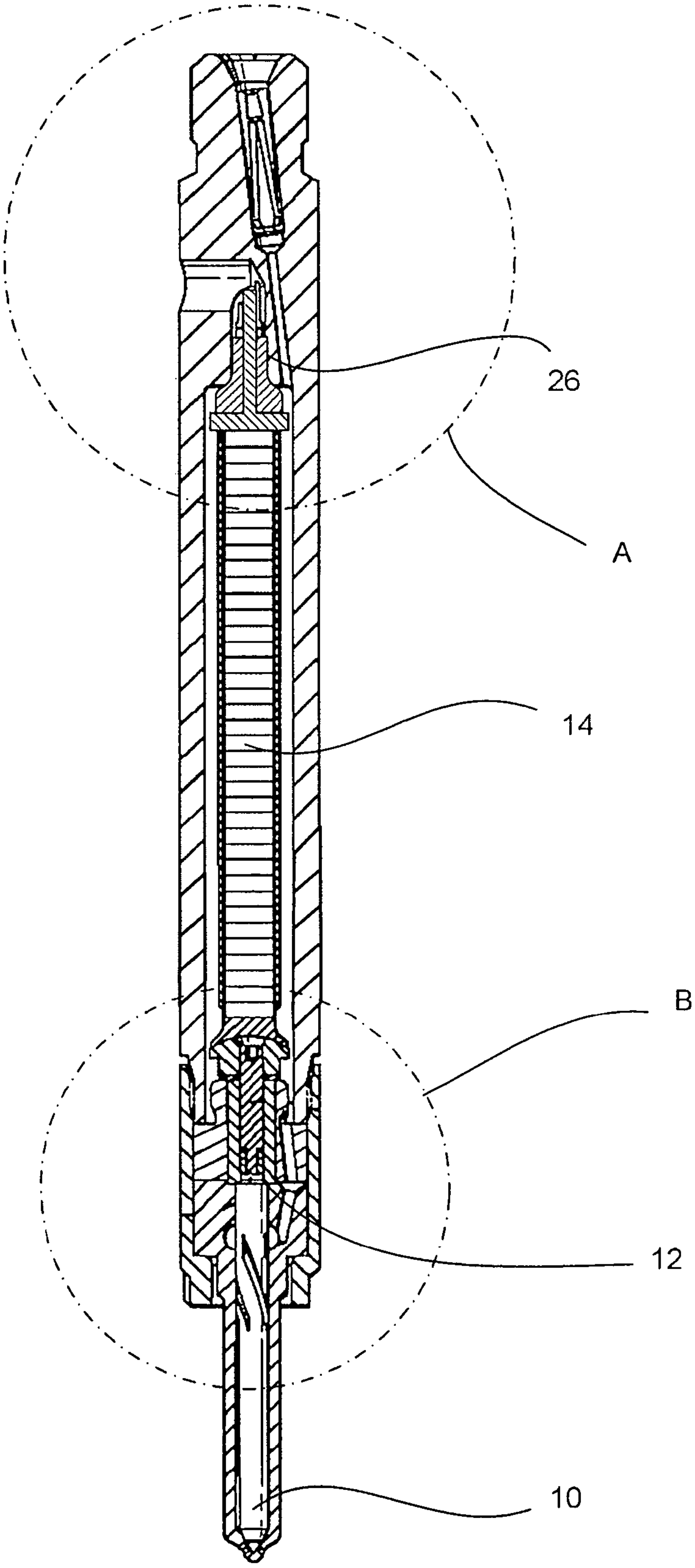
Figure 1a (Prior Art)
FIG. 1*a* (prior art) is a sectional view of a fuel injector of the type including a piezoelectric actuator, to which the method of the present invention may be applied, FIG. 1*b* (prior art) is an enlarged view of an upper portion of the fuel injector in FIG. 1, FIG. 1*c* (prior art) is an enlarged view of a middle portion of the fuel injector in FIG. 1, FIG. 2*a* (prior art) shows an ideal graph of charge versus time for opening and closing phases of the fuel injector in FIGS. 1*a* to 1*c;*
Figure 1B:
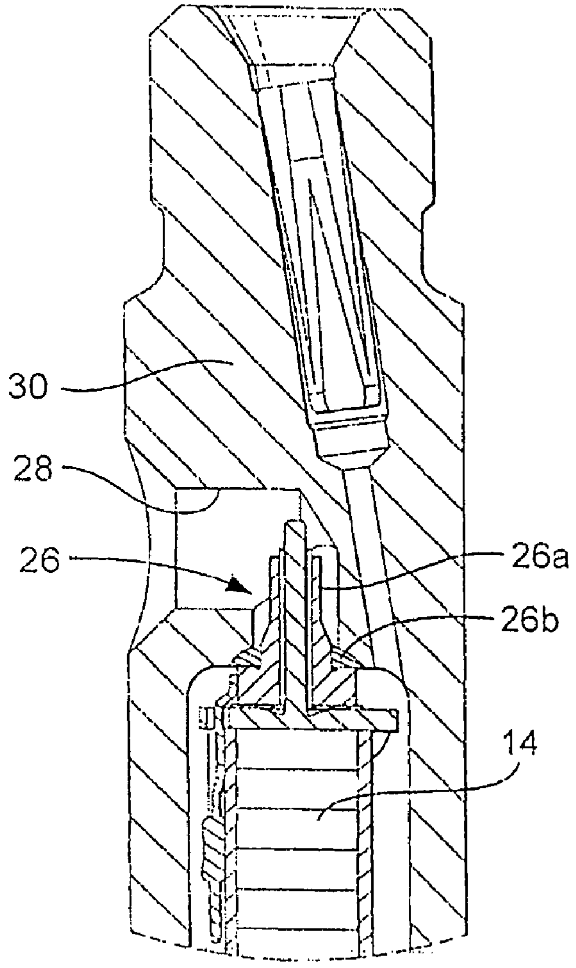
Figure 1b (Prior Art)
Figure 1C:
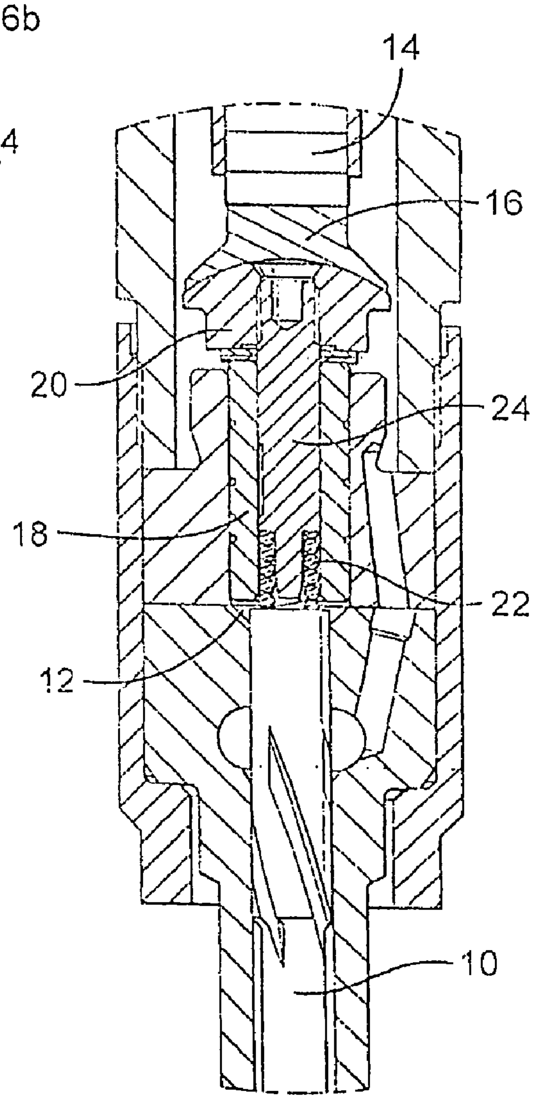
Figure 1c (Prior Art)

Referring to FIGS. 1*a* to 1*c*, a fuel injector of the piezoelectrically operable type typically includes a valve needle 10 that is engageable with a seating to control fuel delivery to an associated engine cylinder. A surface associated with the valve needle 10 is exposed to fuel pressure within a control chamber 12. The valve needle 10 is moveable between a first position, in which it is engaged with its seating, and a second position, in which the valve needle is lifted from its seating. When the valve needle 10 is in its first seated position fuel injection does not occur, and when it is moved away from its first position towards its second position injection is commenced. The injector receives fuel from a common rail source (not shown) of high-pressure fuel having a rail pressure, $R_p$, that is measured by a suitable sensor (not shown).

The injector includes a hydraulic amplifier arrangement including a control piston 18 that is operable to vary the volume of the control chamber 12. Movement of the control piston 18 is controlled by means of a piezoelectric actuator arrangement including a stack 14 of one or more elements formed from a piezoelectric material. The actuator stack 14 carries, at its lower end, an anvil member 16 that is coupled to the control piston 18 through a load-transmitting member 20. By controlling the length of the actuator stack 14, and hence the position of the control piston 18, movement of the valve needle is controlled between its seated and unseated positions, with the change in displacement of the stack 14 being amplified to move the valve needle 10 through an amount determined by the characteristics of the hydraulic amplifier arrangement. A spring 22 serves to urge the valve needle 10 against its seating, and the biasing force of the spring is set by adjustment of a screw threaded rod 24 that passes through the control piston 18.

As can be seen most clearly in FIG. 1*b*, the uppermost end of the actuator stack 14 is secured to an electrical connector 26 including first and second terminals 26*a*, 26*b* that extend into a radial drilling 28 in an actuator housing 30 to permit appropriate electrical connections to be made to control the piezoelectric actuator.

The piezoelectric actuator shown in FIGS. 1*a* to 1*c* is operable to control movement of the valve needle of the injector between the open and closed positions as the piezoelectric stack length is varied. When a first relatively high voltage is applied across the actuator stack 14, the piezoelectric material is energized to a first, higher energization level and the length of the stack is relatively long. In this position, the valve needle 10 occupies a position, in which the valve needle 10 is seated (i.e., a non-injecting state). When a second, relatively low voltage is applied the actuator stack 14, the piezoelectric material is de-energized to second, lower energization level and the length of the stack 14 is reduced. The actuator is therefore displaced, with the result that the valve needle 10 is caused to lift away from its seating (i.e., an injecting state). Between the first and second energization levels the actuator stack 14 is said to have a "stack displacement" or "stroke" that is equal to the change in length of the stack 14 between the two energization levels. The voltages and/or other control signals are supplied to the actuator by means of a computer processor or engine controller as described further below. Further constructional and operational details of the injector in FIGS. 1*a* to 1*c* are described in our co-pending patent application EP 0995901 A1 and so will not be described in further detail here.

As explained earlier, the stack 14 consists of a number of capacitive elements that are effectively connected in parallel. As capacitors block direct current (DC), the stack displacement is not directly controlled by applying a voltage across the stack 14. Instead, the stack 14 is charged to various energization levels by driving an alternating current (AC), the root mean square (RMS) of which is a known constant, through the stack for a given time, in accordance with the relationship below:

$$\text{Charge } (Q) = \text{Current } (I) \times \text{time } (t)$$

Figures 2A, 2B:
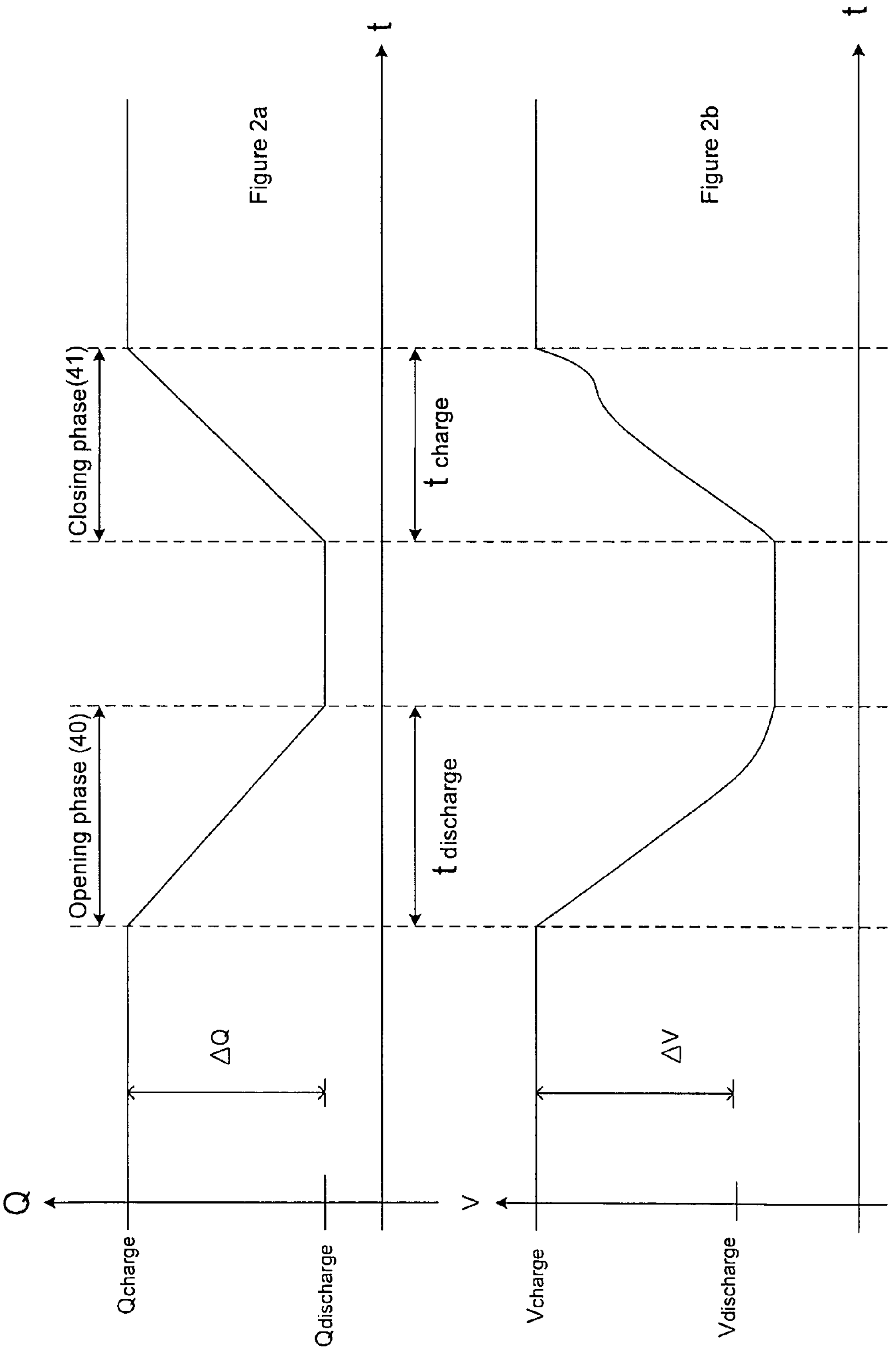
FIG. 2*b* (prior art) shows a graph of voltage versus time, corresponding to FIG. 2*a*, for the opening and closing phases of a piezoelectrically actuated fuel injector.

FIG. 2*a* shows a typical graph of charge as a function of time for an actuator that is driven from a closed non-injecting position to an open injecting position (i.e., an opening phase 40) and back again to the non-injecting position (i.e., a closing phase 41).

During the opening phase the charge changes from a first charge level $Q_{charge}$ to a second charge level $Q_{discharge}$ over a discharge time $t_{discharge}$. The difference between $Q_{charge}$ and $Q_{discharge}$ equals a change in charge $\Delta Q$ that corresponds to the length of the stack 14 changing from a relatively long length to a relatively short length.

FIG. 2*b* shows a graph of voltage as a function of time corresponding to FIG. 2*a*. As shown, a change in charge results in a corresponding change in the voltage across the stack.

It is to be appreciated that the RMS current can be varied by the ECM under various specific operating conditions.

The ECM contains fuelling and timing strategies that determine the number of injection events per engine cycle and the time separation between these injection events. These strategies use various engine parameters including, but not exclusively, engine speed, torque, rail pressure and engine and fuel temperatures. These strategies can be calibrated to optimize engine performance, over the entire engine operating range, in terms of engine noise, emissions (NOx, particulates etc), engine performance and fuel economy.

This optimization in certain conditions requires minimization of the separations between injection events, in particular pilot to main separation or split main operation. Pilot to main separation influences noise and NOx formation, while split main operation is used to combat soot creation.

Figure 3:
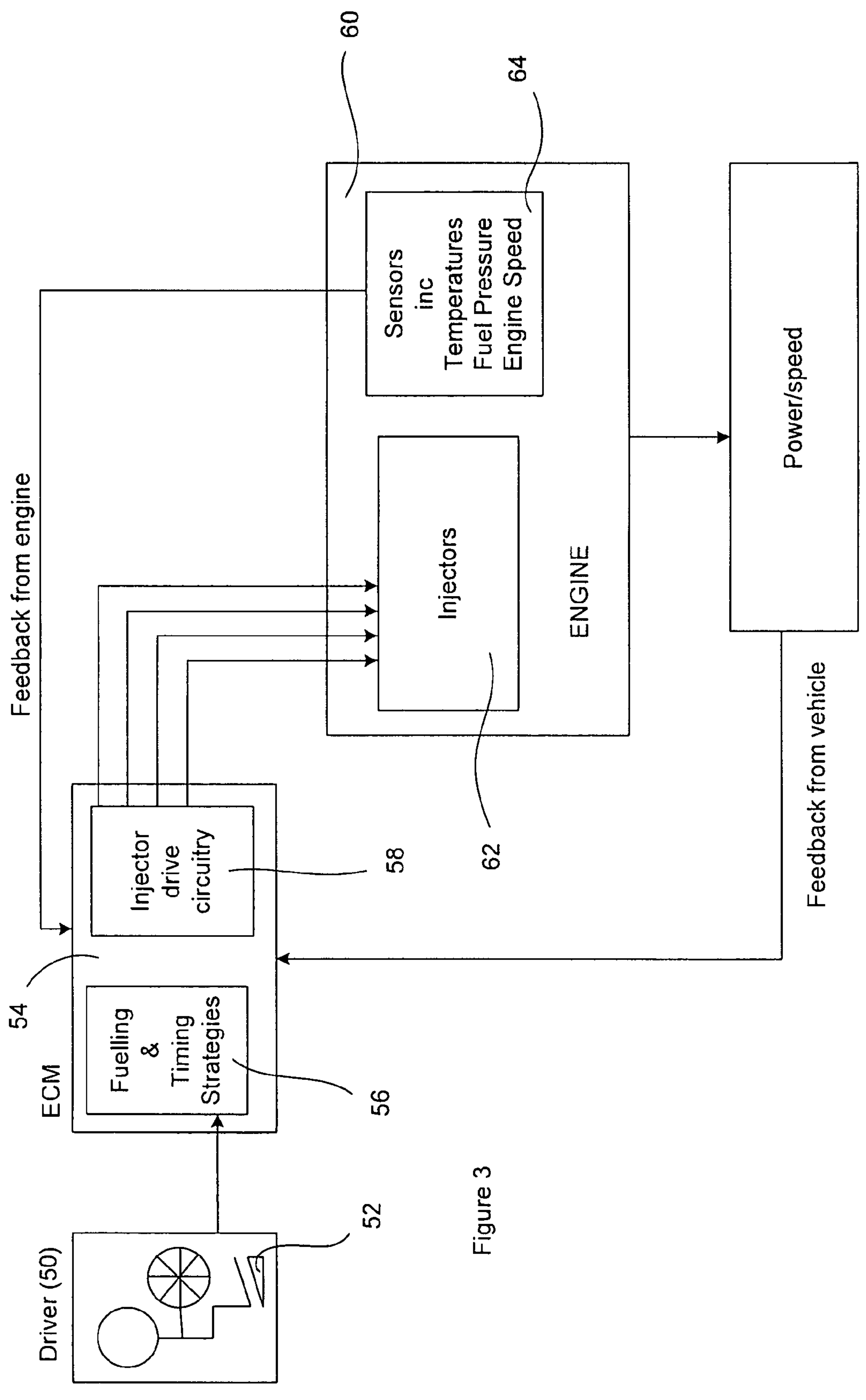
FIG. 3 shows a block diagram of an engine control system, including an ECM, for controlling operation of fuel injectors of the type shown in FIGS. 1*a* to 1*c,*

FIG. 3 shows a block diagram of an engine management control loop. A driver 50 controls the speed and acceleration of the engine/vehicle using the accelerator 52. This is fed into the ECM 54, which includes a sub-module 56 for determining fuelling and timing strategies between injection events, and injector drive circuitry 58 for controlling the operation of the injectors. An engine 60 is shown as including the injectors 62 and temperature, fuel pressure and engine speed sensors 64. Data from these sensors is fed back to the ECM and is used to determine the required fuelling and timing strategies. The engine 62 delivers power and speed to the vehicle and a measure of this is fed back to the ECM 54 for determining the fuelling and timing strategies.

Figure 4:
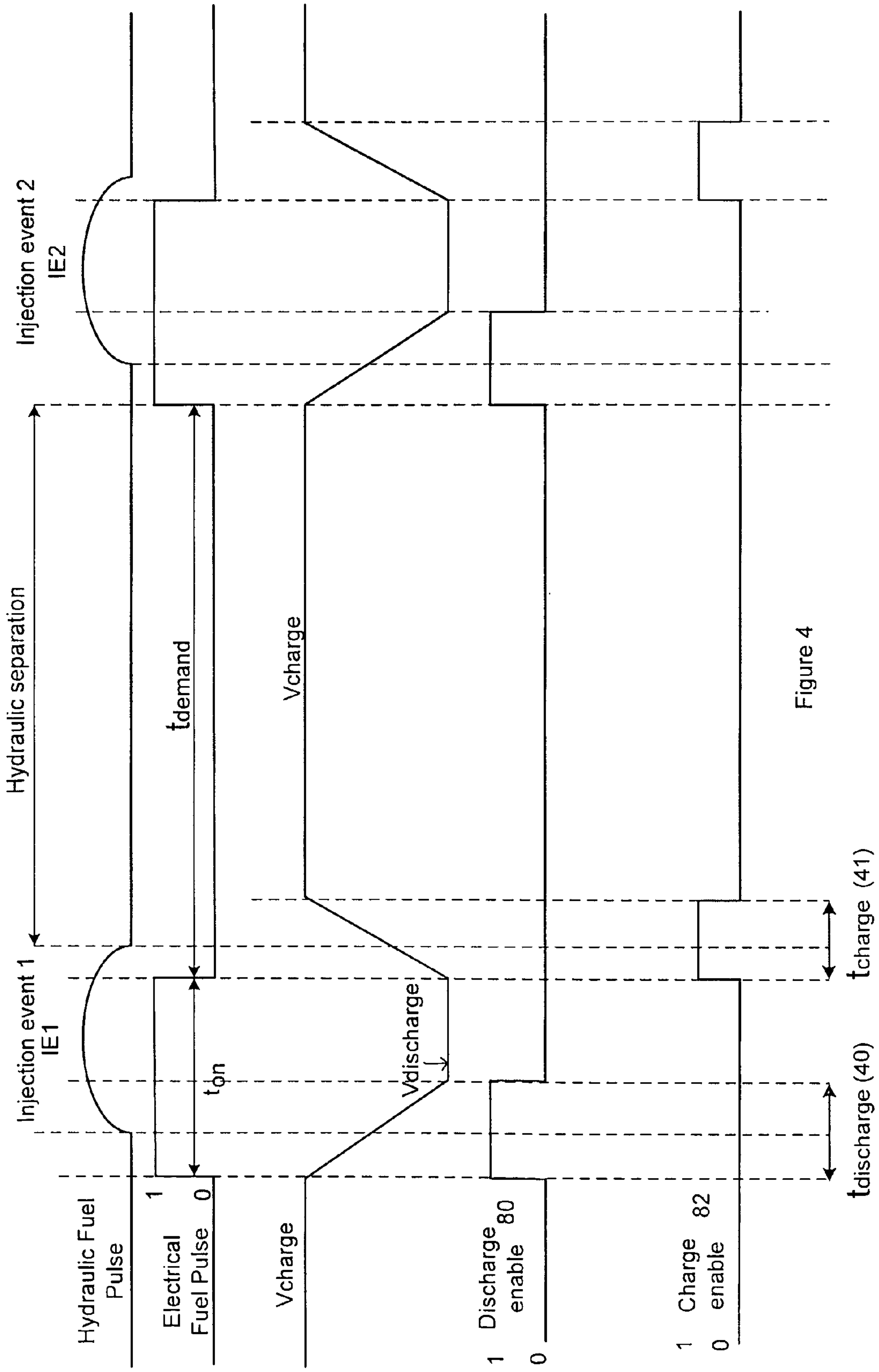
FIG. 4 a hydraulic fuel pulse waveform and corresponding electrical signals (fuel pulse) and voltage waveforms for two injection events, including charge and discharge enable signals.

FIG. 4 shows a fuel delivery waveform (a hydraulic fuel pulse waveform) and corresponding electrical signals (fuel pulse) and voltage waveforms for two injection events, injection event one IE1 and injection event two IE2. As shown, the demand time $t_{demand}$ is the time separation between the time, at which the electrical fuel pulse goes "low 0" so as to stop fuel delivery and then subsequently goes "high 1" so as to resume fuel delivery. The demand time $t_{demand}$ is calculated by the timing strategy in the ECM.

As described above, before each injection event the voltage across the stack 14 is held high 1 at a first voltage level $V_{charge}$. The ECM provides a discharge enable signal 80 to drive the circuit. When the discharge enable signal 80 changes from logic low 0 to logic high 1 an RMS discharge current $I_{discharge}$ is driven through the stack 14 such that the stack 14 begins to discharge, and the voltage across the stack 14 reduces. The discharge enable signal 80 is held high 1 for a predetermined discharge time $t_{discharge}$ before returning to logic low 0. The discharge time $t_{discharge}$ is calculated using look up tables stored within the ECM and depends on the rail pressure $R_p$. The discharge time $t_{discharge}$ is adjusted according to a proportion of the previous discharge time $t_{discharge\_previous}$, which is fed back in a control loop. At the conclusion of the discharge time $t_{discharge}$ the voltage across the stack 14 is at a second voltage level $V_{discharge}$.

The ECM controls the length of fuel delivery time depending on the operating strategy. A charge enable signal 82 controls when an RMS charge current must be driven through the stack in order to charge it from the second charge level $Q_{discharge}$ to the first $Q_{charge}$, which, in turn, results in the voltage across the stack 14 increasing from the second voltage level $V_{discharge}$ to the first voltage level $V_{charge}$. The time required by the injector to open is known, and so the time, at which the charge enable signal 82 must be changed from logic low 0 to logic high 1 in order to charge the stack 14, can be determined.

The discharge time is used to calculate how much charge was removed from the stack 14 during the opening phase 40. A charge time $t_{charge}$ is therefore calculated such that the charge removed during the discharge/opening phase 40 is reapplied during the closing/charge phase 41. In practice, the charge applied during the charge phase 41 may be higher than the charge removed during the discharge phase in order to account for any losses in the system. The time, for which the charge enable signal 82 is held high 1, is calculated from the known RMS charge current and the required charge using the formula:

$$\text{charge enable time} = \frac{\text{charge removed during discharge} \times \text{system losses gain}}{\text{RMS charge current}}$$

$$t_{charge} = \frac{Q_{discharge} \times K_{losses}}{I_{charge}}$$

The relationship between the stack voltage and the stack displacement is non-linear, whereas the relationship between the charge and the displacement is linear. Although the voltage can be measured relatively easily, it cannot be used to accurately determine the position of the stack. This is mainly due to dynamic capacitance effects within the stack as it is extended or compressed. While it is common to control fuel injectors by targeting a voltage across the stack, it is actually the charge on the stack that provides the more accurate control measure. Using a so-called "charge control" method includes charging the stack 14 during a charging phase 41 to a target charge level. This provides a reference point, by which the subsequent discharging phase 40 can be controlled.

Figure 5:
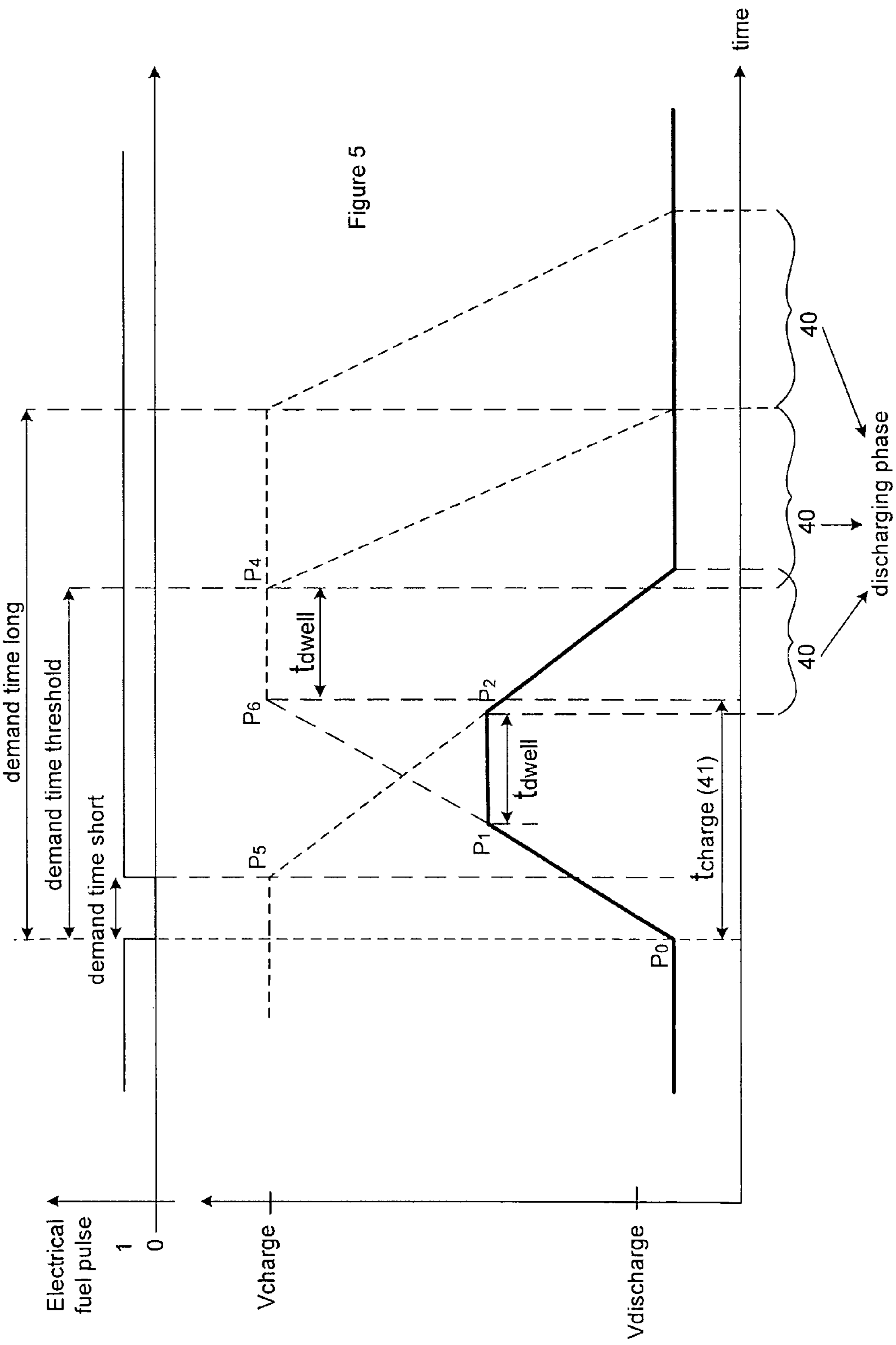
FIG. 5 shows an electrical fuel pulse waveform and a corresponding voltage waveform for a closing phase of one injection event and an opening phase of a second injection event occurring at three different times, resulting in three different demand times.

As shown in FIG. 5, the time required to ensure that the injector has returned to the first voltage level $V_{charge}$ is given by:

$$t_{closing} = t_{charge} + t_{dwell}$$

As explained above, $t_{charge}$ is calculated by dividing the charge that was taken off during the discharging phase, including an additional amount to account for any losses, by the RMS charge current $I_{charge}$. It is worth noting that the RMS charge and discharge currents need not be equal. Therefore, $t_{discharge}$ need not equal $t_{charge}$. The RMS current levels affect the velocity of the stack (i.e., the speed, at which the length of the stack changes). This in turn affects the rate of fuel injection. The RMS current levels may vary across the engine operating range to achieve desired performance in terms of rate of fuel injection. The time $t_{dwell}$ is added to account for the fact that a finite time is required for the hardware to switch off the charge enable signal (i.e., signal 82 in FIG. 4) before the discharge enable signal (i.e., signal 80 in FIG. 4) can be switched on for a subsequent injection event. This is typically in the order of tens of microseconds.

In known injector systems the minimum demand time depends on the time it takes to fully charge the injector plus the dwell time, because as described above the injector can only begin to discharge once it has been fully charged. However, to improve flexibility, it is desirable to reduce the demand time further.

The present invention is used to control the delivery of fuel such that a demand time smaller than that of conventional systems is achievable, through adjustment of the charging phase and the subsequent discharging phase.

As shown by the short dashed line in FIG. 5, when the demand time required by the ECM is relatively large there is more than enough time for the injector, during the closing phase, to be charged to the first voltage level $V_{charge}$ (P0 to P6), and for the charge circuit to be switched off (i.e., the dwell time, P6 to P4). In this case, no adjustment of the charging phase and subsequent discharge phase is required and the present invention operates in a conventional manner. This is referred to as operation in a conventional mode.

The long dashed line in FIG. 5 shows a threshold condition where there is exactly enough time for the injector to be fully charged (P0 to P6), and for the dwell time to expire (at P4) before the injector is discharged. As shown, fuel delivery stops at point A, during the charging phase 41, before it begins again at point B, during the discharging phase 40. The difference between points A and B is known as a threshold demand time $t_{demand\_threshold}$. A demand time larger than the threshold demand time $t_{demand\_threshold}$ would result in the present invention operating in the conventional manner described above. However, if a demand time shorter than the threshold demand time $t_{demand\_threshold}$ is required, for example that shown by the solid line in FIG. 5, the invention operates in a different manner in order to ensure that the required demand time is met. When operating in the latter manner the ECM effectively merges a charging/closing phase of a first pulse with a discharging/opening phase of a separate second pulse. This will be referred to as operation in a merging pulse mode. This threshold condition is the minimum demand time achievable in known conventional systems. As the demand time reduces, a seamless transition occurs between the two modes of operation.

The limit to how short the demand time can be is determined by the ECM hardware switching times. There is a minimum time, for which the charge enable must be active before it can be de-activated, and the dwell time must elapse before the subsequent discharge enable can be switched on. In total this limit is in the order of 50 μs.

However, the present invention advantageously enables the ECM to operate with demand times between the actual limit set by the finite times described above and the threshold condition that is the minimum demand time previously achievable in known systems.

ECM operation in the conventional or merging pulse mode is determined based on the time it takes to fully charge the injector, the dwell time and the required demand time. The time difference between the closing time (i.e., the summation of the charge time and dwell time), and the demand time is referred to as an overlap time:

$$\begin{aligned} t_{overlap} &= (t_{charge} + t_{dwell}) - t_{demand} \\ &= t_{closing} - t_{demand} \end{aligned}$$

When the overlap time is negative, the pulses are sufficiently far enough apart, as shown by the short dashed line in FIG. 5, that no adjustment is required. In this case the ECM operates in the conventional mode. However, when the overlap time is positive, the ECM must operate in the merging pulse mode and is required to adjust the timing of the charging phase and subsequent discharge phase.

When the overlap time $t_{overlap}$ is positive, it is necessary to reduce the time of the charge enable signal 82, and hence the subsequent discharge enable signal 80, so that the stack 14 does not fully charge/discharge. The merge overlap time is effectively the time that is not available for the stack 14 to charge fully prior to discharging. Therefore, the charging and discharging phases 41, 40 are adjusted by dividing the overlap time $t_{overlap}$ proportionally between both the charging and discharging phases 41, 40. As the RMS currents of both of these phases may be different, it is necessary to reduce the charging and discharging times $t_{charge}$, $t_{discharge}$ proportionally. In other words, it is necessary to remove an equal amount of charge from both the charging and discharging phases/slopes, as opposed to simply dividing the overlap time $t_{overlap}$ in half. This is done to ensure that the total change in charge of the second injection event IE2 with respect to the quiescent charge level remains the same, as it is this total charge that determines the relative change in the length of the stack 14.

The proportion of the overlap time $t_{overlap}$ to be taken from the closing phase 41 is used to recalculate the time, at which the charge enable signal 82 should be switched off, i.e., from logic high 1 to logic low 0. After the dwell time $t_{dwell}$ has elapsed the discharge enable signal 80 is then switched from logic low 0 to logic high 1 such that the stack 14 begins discharging (i.e., discharging is initiated).

The solid line in FIG. 5 shows the resulting waveform when two pulses are merged. During the charging phase 41 fuel delivery stops at point A and during the discharging phase 40 fuel delivery begins a point D. The time between A and D is the required demand time $t_{demand}$, which is clearly smaller than the minimum demand time ($t_{demand\_threshold}$) that is possible using conventional systems. As shown, the stack 14 stops charging at point P1 and begins discharging at point P2. The present invention calculates the points P1 and P2 such that the required demand time $t_{demand}$ is met.

Figure 6:
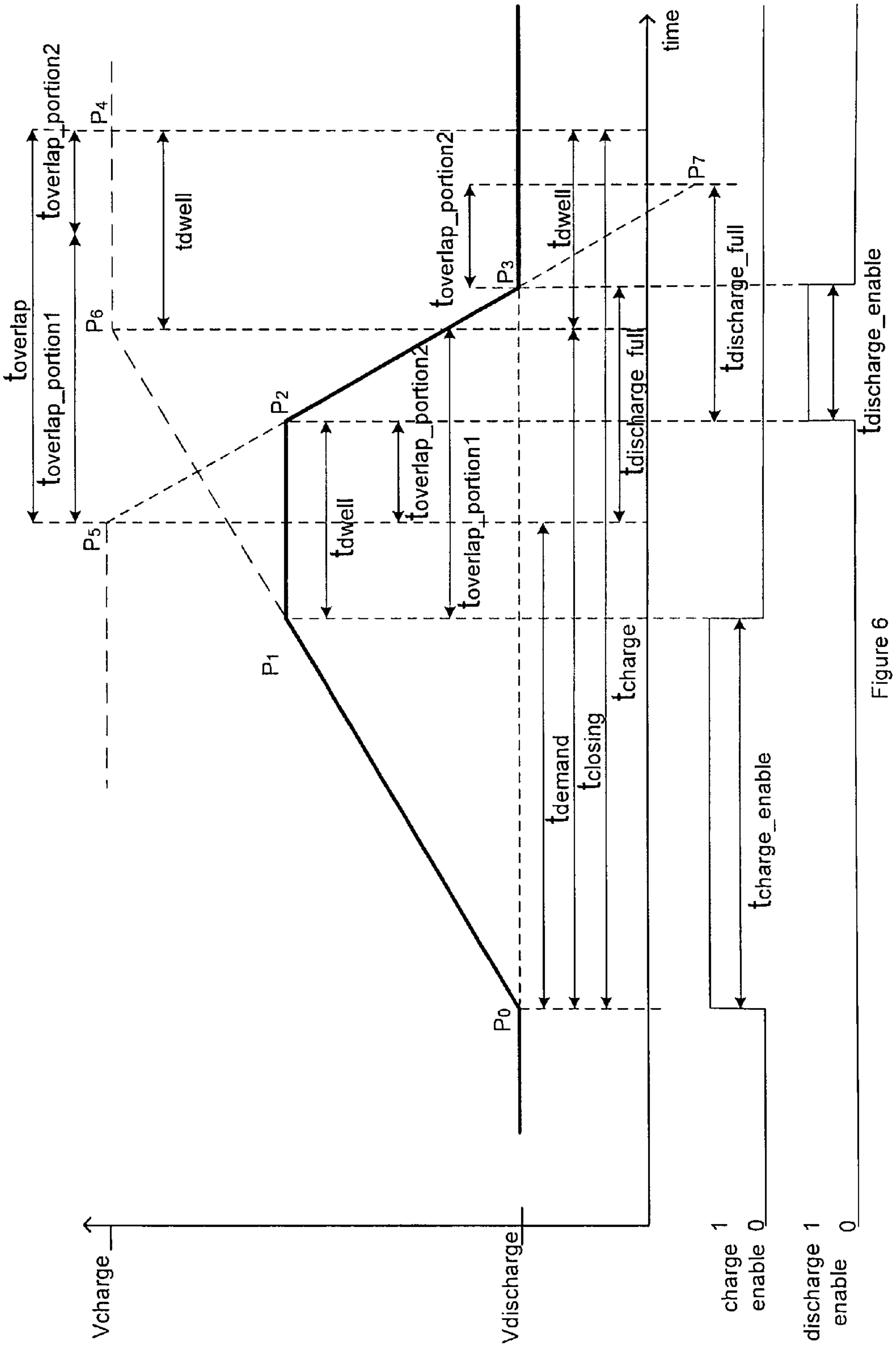
FIG. 6 shows a voltage waveform for a closing phase of one injection event and an opening phase of a second injection event where the pulses are merged.

FIG. 6 shows a merging pulse waveform in more detail. As shown, when the charge enable signal 82 goes high 1 at time $t_{P0}$ the voltage across the stack 14 increases until the charge enable signal 82 goes low 0 at time $t_{P1}$. The voltage across the stack 14 remains substantially constant until the conclusion of the dwell time $t_{dwell}$ at time $t_{P2}$ when the discharge enable signal 80 goes high 1. The voltage across the stack 14 then decreases until the discharge enable signal 80 goes low 0 at time $t_{P3}$.

In addition, FIG. 6 shows that the closing time $t_{closing}$ (charge time $t_{charge}$ plus dwell time $t_{dwell}$) begins at time $t_{P0}$ and continues until time $t_{P4}$ corresponding to point P4. P4 is effectively the point, at which the voltage across the stack 14 would have reached the first voltage level $V_{charge}$ during a non-merged injection event, i.e., the point, at which the first injection event IE1 would have concluded if it were not merged with a second injection event IE2.

Furthermore, FIG. 6 shows that the overlap time $t_{overlap}$ (i.e., $t_{closing}$ minus $t_{demand}$), concluding at $t_{P4}$, effectively begins at $t_{P5}$, corresponding to point P5. Point P5 is in effect the point, at which the second injection event would begun (i.e., the point, at which discharging of the stack would have initiated in order to result in the dashed line in a non-merged second injection event $L_{inj\_event2}$).

The merge overlap time $t_{overlap}$ is divided into two portions, a first portion of the merge overlap time $t_{overplap\_portion1}$ is applied to the closing phase 41, and a second portion of the merge overlap time $t_{overplap\_portion2}$ is applied to the opening phase 40. The time $t_{P1}$, at which the adjusted stop charging point P1 occurs, is calculated by subtracting the first portion of the overlap time $t_{overplap\_portion1}$ from the time $t_{P6}$, at which charging should have stopped in a conventional non-merged injection event (i.e., point P6).

The first portion of the merge overlap time $t_{overplap\_portion1}$, which is applied to the closing phase, is calculated using the following equation:

$$t_{overlap\_portion\,1} = \left(1 - \left(\frac{t_{closing}}{t_{closing} + t_{opening}}\right)\right) t_{overlap}$$

The overlap time $t_{overlap}$ is divided in inverse proportion to the RMS current levels, in order to ensure that the portion removed from the closing phase 41 and the subsequent opening phase 40 correspond to the same electrical charge.

The time $t_{P1}$ (stop charging point P1) is calculated as follows:

$$t_{P1} = t_{P6} - t_{overplap\_portion1}$$

The time $t_{P2}$ (begin discharging point P2) occurs at $t_{P1}$ plus the dwell time $t_{dwell}$.

As stated earlier, in merged pulse mode the stack begins discharging at time $t_{P2}$. If the stack were to be discharged for a full discharge time $t_{discharge\_full}$, calculated for a non-merged pulse, the voltage across the stack could fall below the recommended voltage levels as shown by point P7. Therefore, it is necessary to adjust the discharge time by subtracting the second portion of the merge overlap time $t_{overplap\_portion2}$ from the calculated non-merged discharge time $t_{discharge\_full}$.

The second portion of the merge overlap time $t_{overplap\_portion2}$, which is applied to the opening phase 40, is calculated as follows:

$$t_{overlap\_portion2} = t_{overlap} - t_{overlap\_portion1}$$

The time $t_{P3}$, at which the stack 14 should stop discharging (i.e., at point P3), is calculated by subtracting the second portion of the merge overlap time $t_{overplap\_portion2}$ from the time $t_{P7}$, at which a full discharge would have stopped (i.e., at point P7), where time $t_{P7}$ occurs at time $t_{P2}$ (i.e., point P2) plus the full discharge time $t_{discharge\_full}$. Therefore, time $t_{P3}$, at which the stack should stop discharging, is calculated as follows:

$$\begin{aligned} t_{P3} &= t_{P7} - t_{overplap\_portion\,2} \\ &= (t_{P2} + t_{discharge\_full}) - t_{overplap\_portion\,2} \end{aligned}$$

How the ECM operates, in order to decide which operating mode applies and the calculation of the stop charging, start discharging and stop discharging times $t_{P1}$, $t_{P2}$, and $t_{P3}$ discussed above, will now be described with reference to the flowcharts shown in FIGS. 8 to 10.

Figure 7:
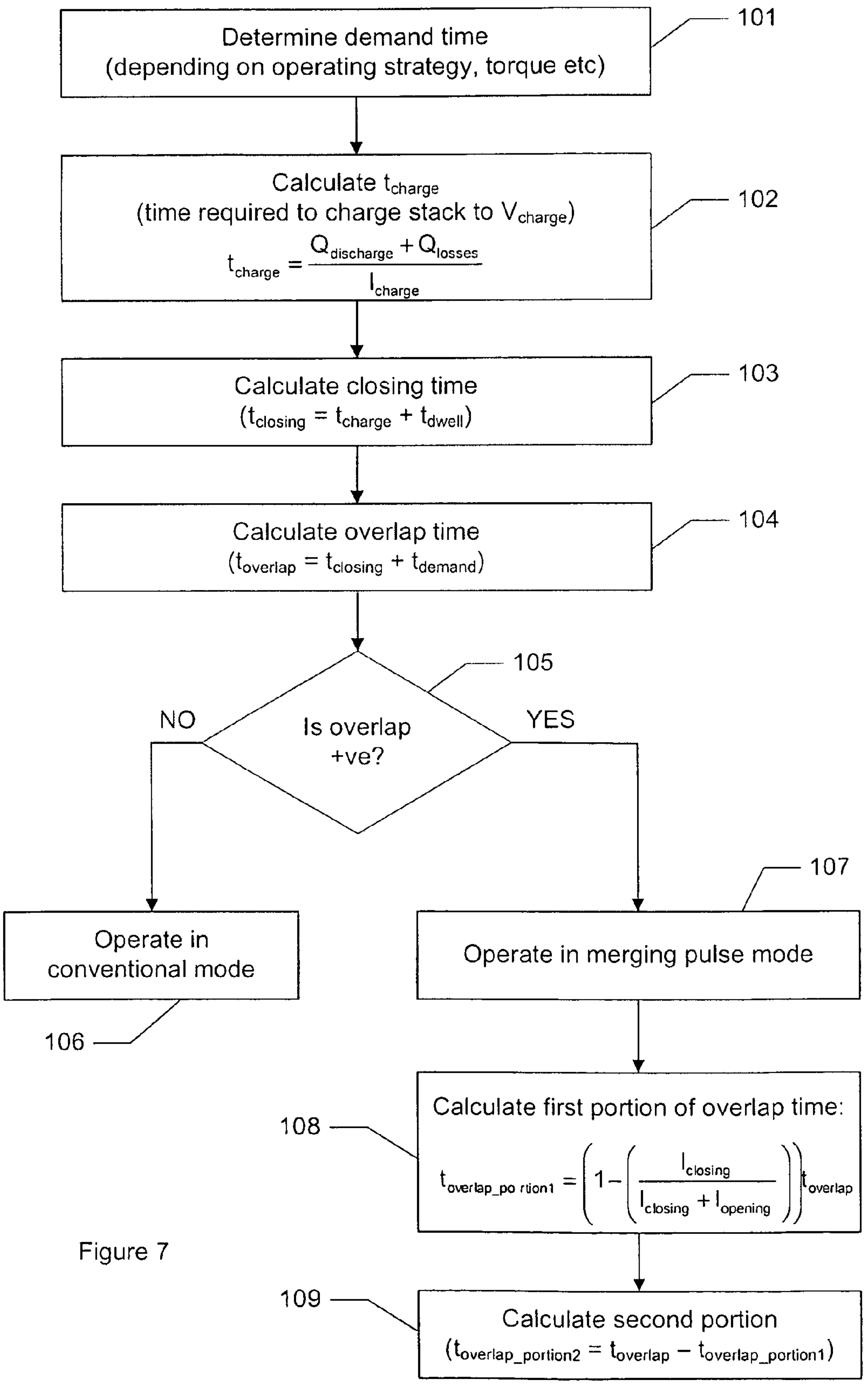
FIG. 7 shows a flow chart of the steps required for the ECM to determine which operating mode, conventional or merging pulse, in which to operate, FIG. 8 (prior art) shows a flow chart of the steps taken by the ECM when operating in conventional mode.

FIG. 7 shows a flowchart of steps, in which the ECM determines which operating mode, conventional or merging pulse, in which to operate. In a first step 101, the ECM 54 determines the demand time $t_{demand}$ required by the engine 60. As discussed above the demand time $t_{demand}$ depends on the current engine operating condition.

In a second step 102, the charge time $t_{charge\_full}$ required to charge the stack 14 fully is calculated. This is effectively the time that the RMS charge current $I_{charge}$ is to be driven through the stack 14, such that the charge previously removed during the discharge phase 40, plus a fraction more, is re-applied to the stack 14, to increase the voltage across the stack 14 to $V_{charge}$.

The injector closing time $t_{closing}$ is then calculated in a third step 103 by adding the charge time $t_{charge}$ and the dwell time $t_{dwell}$ together. This time takes account of the hardware switching times and is the time it takes to guarantee that the voltage across the stack 14 has returned to $V_{charge}$.

The closing time $t_{closing}$, calculated in the third step 103, and the demand time $t_{demand}$, calculated in the first step 101, are then used in a fourth step 104 to determine the overlap time $t_{overlap}$ between the first and second pulses/injection events IE1, IE2.

In a fifth step 105, the ECM determines whether the overlap time $t_{overlap}$ is positive. If the overlap time $t_{overlap}$ is not positive, control passes to a sixth step 106 and the ECM 54 operates in the conventional mode.

Alternatively, if the overlap time $t_{overlap}$ is positive there is insufficient time to permit the stack 14 to fully charge during the charging phase 41 of the first pulse IE1, prior to the discharging phase 40 of the second pulse IE2, in order to achieve the demand time $t_{demand}$ that the ECM 54 requires. Therefore, control passes to a seventh step 107 and the ECM 54 operates in the merging pulse mode.

The overlap time $t_{overlap}$ is proportioned such that the first portion $t_{overplap\_portion1}$ is deducted from the charging phase 41 of the first pulse IE1, and the second portion $t_{overplap\_portion2}$ is deducted from the discharging phase 40 of the second pulse IE2. The first portion of the overlap time $t_{overplap\_portion1}$ is calculated in an eighth step 108, and the second overlap time portion $t_{overplap\_portion2}$ is calculated in a ninth step 109 by deducting the first portion of the overlap time $t_{overplap\_portion1}$ from the overall overlap time $t_{overlap}$.

Figure 8:
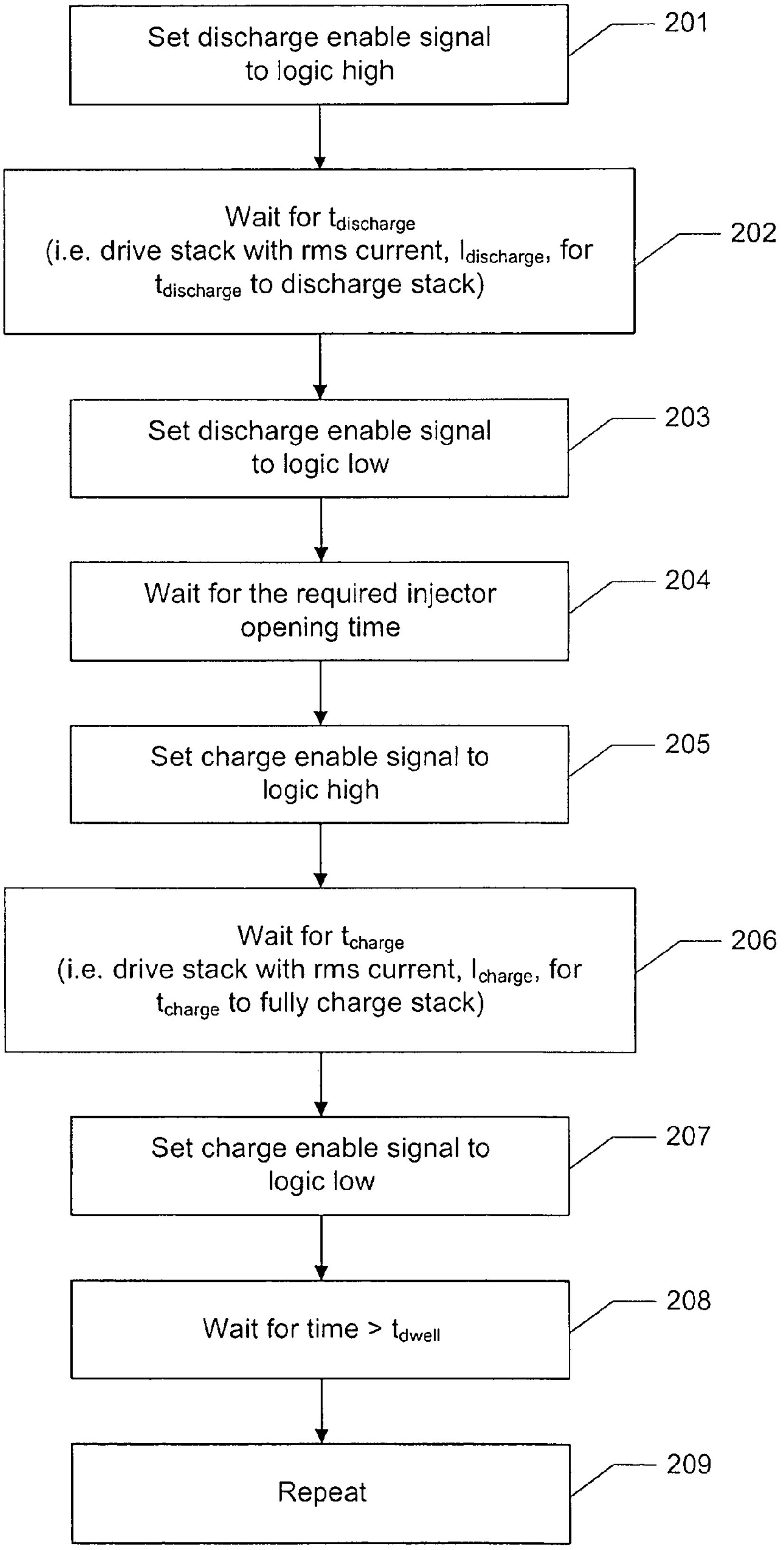
Figure 9:
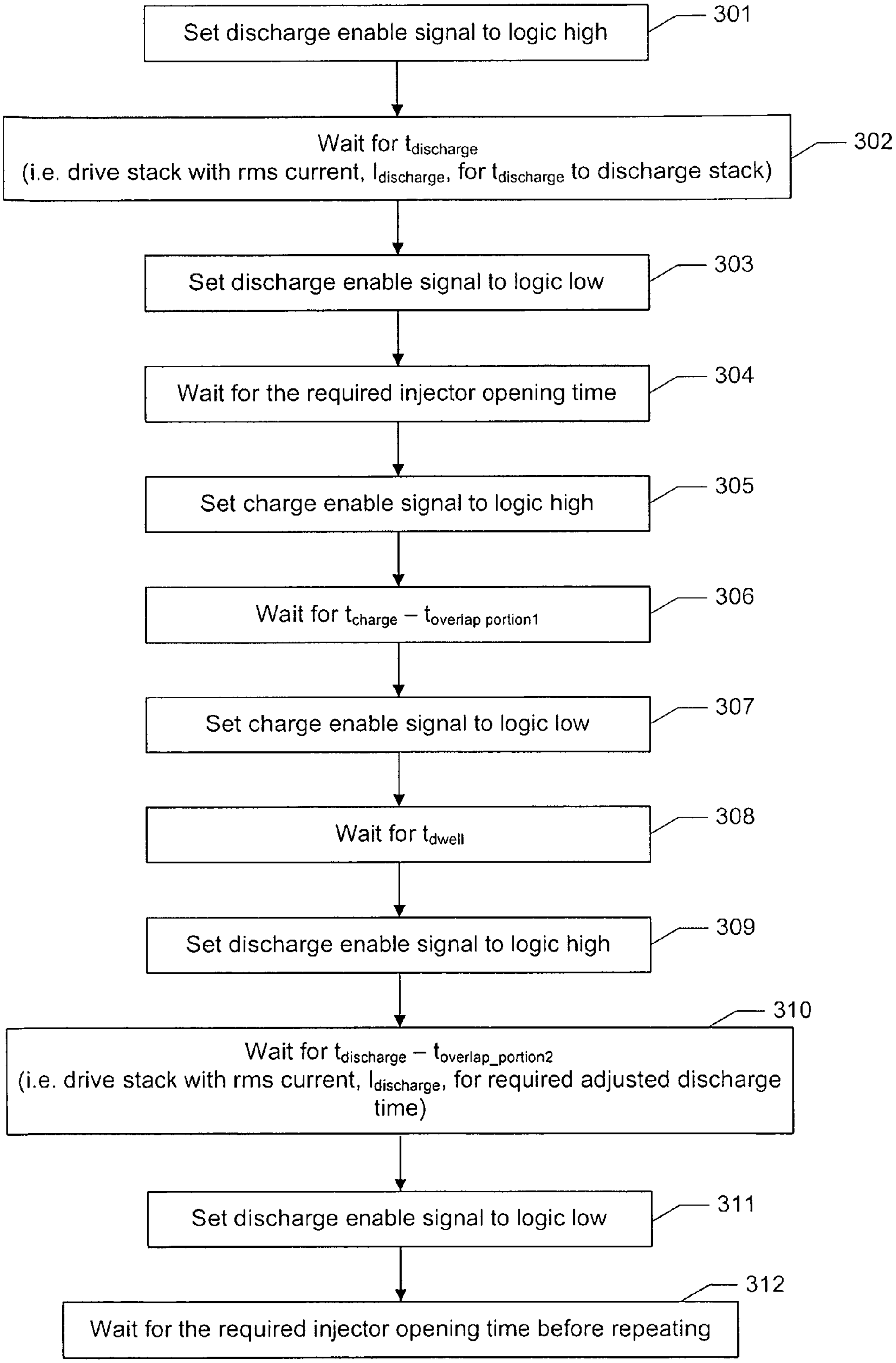
FIG. 9 shows a flow chart of the steps taken by the ECM when operating in merging pulse mode.

FIG. 8 shows a flowchart for conventional mode operation, corresponding to the sixth step 106 in FIG. 7, and FIG. 9 shows a flowchart for merging pulse mode operation, corresponding to the seventh step 107 in FIG. 7.

The flowchart in FIG. 8 shows the present invention operating in the conventional mode. Hence, during an injection event the stack 14 is discharged for the required discharge time such that the injector opens and fuel is delivered.

In a first step 201 of the conventional mode, the discharge enable signal 80 is set to logic high 1, and the stack 14 begins to discharge. The discharge enable signal 80 is held in this state, in a second step 202, for the required discharge time $t_{discharge\_full}$. At the conclusion of this time interval, in a third step 203, the discharge enable signal 80 is set to logic low 0, as the stack 14 is now discharged. In a fourth step 204, the stack is held in this state for the required injector opening time as determined by the ECM 54.

At the appropriate time, as determined by the ECM fuelling and timing strategy 56, in a fifth step 205, the charge enable signal 82 is set to logic high 1, such that the stack 14 begins to charge. The charge enable signal 82 is held high 1 during a sixth step 206 for the required charge time $t_{charge\_full}$, which is the time needed to charge the stack 14 fully and return the voltage across the stack 14 to $V_{charge}$.

At the conclusion of the charge time $t_{charge}$, in a seventh step 207, the charge enable signal 82 is switched to logic low 0 as the stack 14 is now fully charged. During an eighth step 208, the stack 14 is held in this state for a time, longer than the dwell time $t_{dwell}$, which is determined by the ECM fuelling and timing strategy 56. Control of the ECM 54 then passes back to the first step in FIG. 7.

The flowchart in FIG. 9 shows the present invention operating in the merging pulse mode. In a first step 301 of the merging pulse mode, the discharge enable signal 80 is set to logic high 1, and the stack 14 begins to discharge. In a second step 302, the discharge enable signal 80 is held in this state for the required discharge time. At the conclusion of this time interval, in a third step 303, the discharge enable signal 80 is set to logic low 0, as the stack 14 is now discharged. In a fourth step 304, the stack 14 is held in this state for the required injector opening time.

At the appropriate time (calculated depending on how long fuel is required for), the charge enable signal 82 is set to logic high 1 in a fifth step 305, such that the stack 14 begins to charge. During a sixth step 306, the charge enable signal 82 is held high 1 until time $t_{P1}$, which is determined by subtracting the first portion of the overlap time $t_{overplap\_portion1}$ calculated in the eighth step 108 of FIG. 7 from the time $t_{charge\_full}$ required to charge fully the stack 14 and return the voltage across the stack 14 to $V_{charge}$.

In a seventh step 306, at time $t_{P1}$, the charge enable signal 82 is switched to logic low 0. The stack 14 is not fully charged but is sufficiently charged such that the injector is closed and fuel delivery ceases. In an eighth step 308, the stack 14 is held in this state for the dwell time $t_{dwell}$, in order to allow enough time for the hardware switching devices to change state.

In a ninth step 309, at the conclusion of the dwell time interval $t_{dwell}$, the discharge enable signal 80 is set to logic high 1 at time $t_{P2}$ such that the stack 14 begins to discharge again. In a tenth step 310, the discharge enable signal 80 is held high 1 until time $t_{P3}$, which is determined by subtracting the second portion of the overlap time $t_{overplap\_portion2}$ (calculated in the ninth step of FIG. 7) from the discharge time $t_{discharge\_full}$ that would be required for full discharge. At time $t_{P3}$, in an eleventh step 311, the discharge enable signal 80 is set to logic low 0.

In a twelfth step 312, the stack 14 is held in this state for the required injector opening time before the stack 14 is charged again and the sequence repeated.

In the above example, it is assumed that a full discharge occurs in the first instance prior to the charging phase 41 of the first injection event IE1 being merged with the discharge phase 40 of a second injection event IE2. However, it is to be appreciated that the stack 14 need not fully discharge and in that case the discharge time is adjusted accordingly.

The ECM 54 operating in the merging pulse mode of the invention ensures a greater flexibility in the demand time $t_{demand}$ in comparison to prior art systems operating in a conventional mode where the demand time $t_{demand}$ cannot be reduced below the time it takes to charge the stack 14 fully. This is advantageous since a shorter demand time results in increased flexibility of operation, allowing for optimization of engine performance and emissions.

It will be appreciated that the invention provides the further flexibility of being able to switch between a conventional mode of operation, and a merging pulse mode of operation, depending upon the demand time required by the ECM in accordance with the engine operating conditions.

FIGS. 11 to 14 show example waveforms for different operating conditions.

Figure 10:
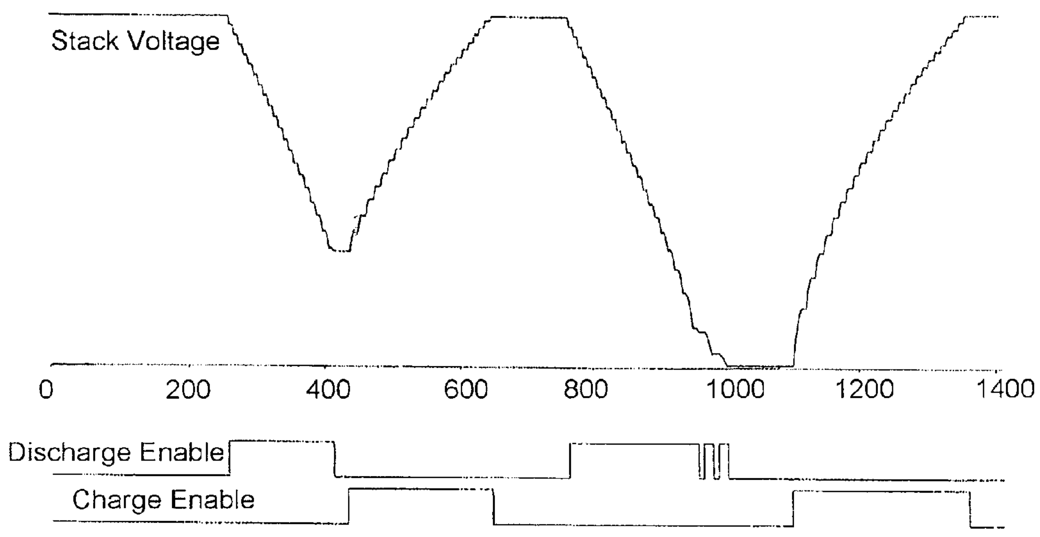
FIG. 10 shows non-merged pilot and main injection events.
Figure 11:
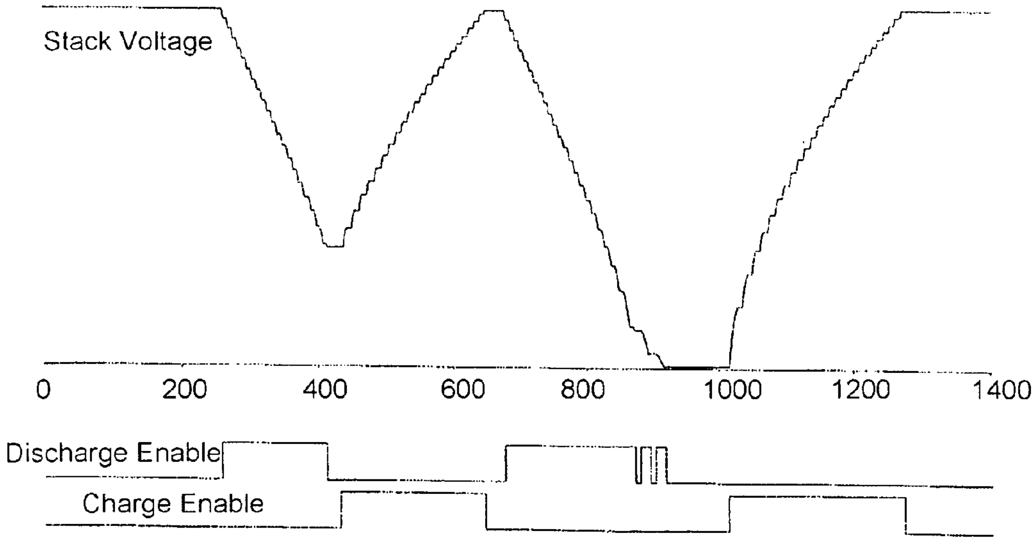
FIG. 11 shows non-merged pilot and main injection events with a shorter separation time than that shown in FIG. 10.

FIG. 10 shows typical linked pilot and main injection events with sufficient separation such that there is no overlap between the pilot and main events and the ECM operates in the conventional mode. The linked pilot and main injection events shown in FIG. 11 are similar to those shown in FIG. 10, with a reduced separation between both events.

Figure 12:
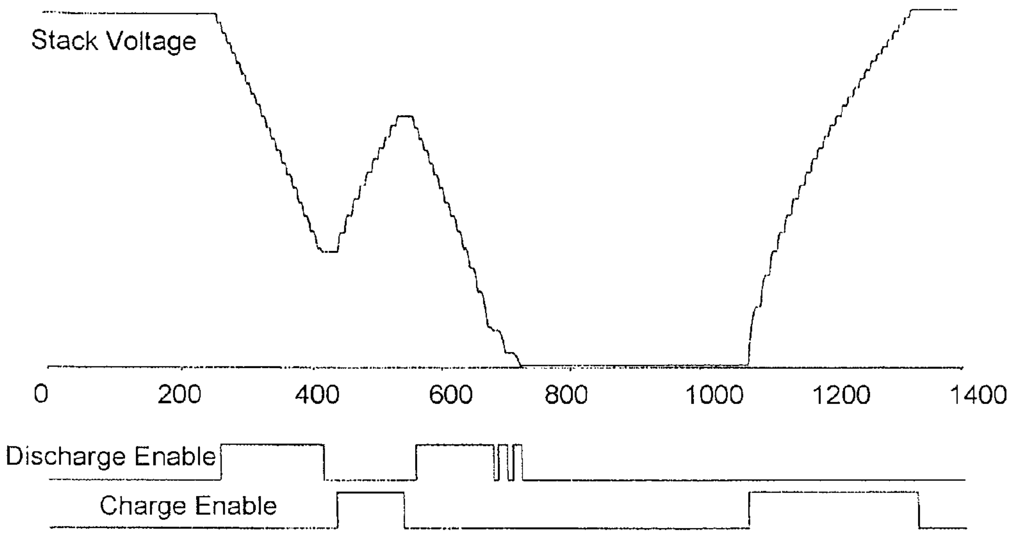
FIG. 12 shows merged pilot and main injection events.
Figure 13:
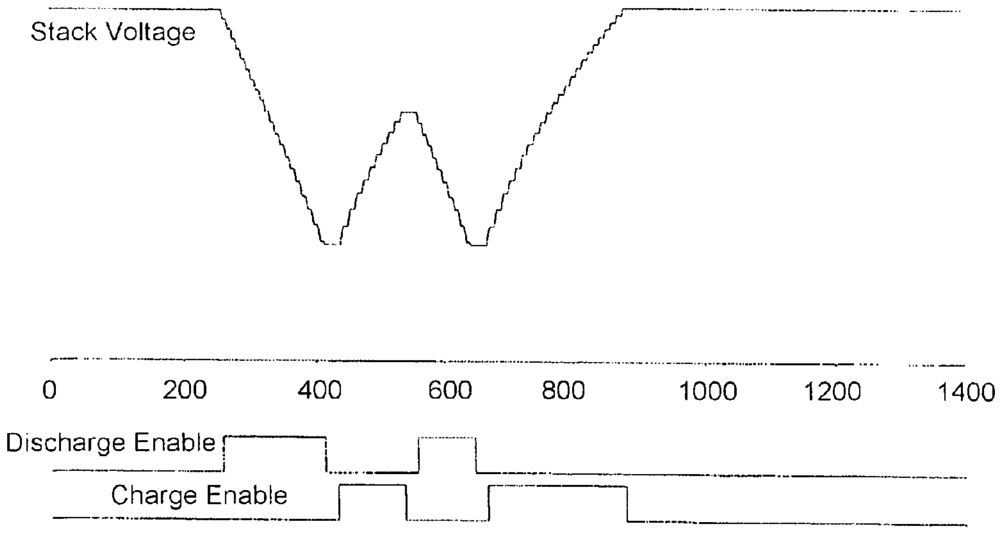
FIG. 13 shows merged pilot and main injection events, where the period of the main injection event has been reduced.

FIG. 12 shows linked pilot and main injections, which have been merged such that the charging phase of the pilot injection and the discharging phase of the main injection have been truncated (i.e., merged pulse mode).

The pilot and main injection events shown in FIG. 13 are again merged. However, in this case the period of the main injection event has also been reduced such that the stack does not discharge fully prior to the subsequent charging phase of the main injection event. It is to be appreciated that the minimum stack voltage is not necessarily equal during the two injection events.

It is to be appreciated that although the present invention is described above in relation to de-energize-to-inject injectors, the present invention can also be implemented using energize-to-inject injectors.

The invention claimed is:

1. A control method for a fuel injector having a piezoelectric stack that is charged by means of a charge current and that is discharged by means of a discharge current, the fuel injector, in operation, defining an injector closing time, the method comprising:

determining a required separation time between: (i) a termination of an electrical on signal associated with a first injection event; and (ii) an initiation of an electrical on signal associated with a second injection event;

calculating an overlap time between the required separation time and the time required to charge the piezoelectric stack to a first reference level using the charge current;

dividing the overlap time into first and second time periods as a function of the charge and discharge currents;

applying the charge current to the piezoelectric stack for a charge time calculated on the basis of the first time period of the overlap time; and applying the discharge current to the piezoelectric stack for a discharge time so as to discharge the stack to a second reference level;

wherein the discharge time is calculated on the basis of the second time period of the overlap time, such that the first and second injection events are merged in a merging pulse mode of operation.

2. The method according to claim 1, wherein the charge time is calculated by subtracting the first time period of the overlap time from the time required to charge the stack to the first reference level, such that the voltage across the stack increases from a low voltage level to a high voltage level.

3. The method according to claim 1, wherein the discharge time is calculated by subtracting the second time period of the overlap time from the time required to discharge the stack to the second reference level, such that the voltage across the stack decreases from a high voltage level to a low voltage level.

4. The method according to claim 1, wherein the method includes selecting operation in the merging pulse mode depending on the overlap time.

5. The method according to claim 1, wherein the method includes selecting operation in the merging pulse mode depending on the required separation time.

6. The method according to claim 1, wherein the method includes selecting operation in the merging pulse mode depending on the injector closing time.

7. The method according to claim 1, wherein the method operates in an alternative mode of operation when not operating in the merging pulse mode, the alternative mode of operation comprising:

applying the charge current to the piezoelectric stack for the time required to charge the piezoelectric stack to the first reference level; and applying the discharge current to the piezoelectric stack for the time required to discharge the piezoelectric stack to the second reference level, such that the voltage across the piezoelectric stack decreases from a high voltage level to a low voltage level.

8. The method according to claim 1, wherein the required separation time is determined using an engine control module ECM.

9. The method according to claim 1, wherein the overlap time is calculated by subtracting the required separation time from the closing time.

10. The method according to claim 1, wherein the closing time is calculated by adding the charge time required to charge the piezoelectric stack to the first reference level, to a dwell time, which depends on at least a hardware switching time.

11. The method according to claim 1, wherein the overlap time is divided in inverse proportion to the charge and discharge currents to result in the first and second time periods.

12. The method according to claim 1, wherein the first reference level is a fully charged level for the piezoelectric stack.

13. The method according to claim 1, wherein the second reference level is a fully discharged level for the piezoelectric stack.

14. A controller for a fuel injector comprising a piezoelectric stack that is charged by means of a charge current and that is discharged by means of a discharge current, the fuel injector, in operation, defining an injector closing time, the controller comprising circuitry arranged to:

determine a required separation time between: (i) a termination of an electrical on signal associated with a first injection event; and (ii) an initiation of an electrical on signal associated with a second injection event;

calculate an overlap time between the required separation time and a quantity of time required to charge the piezoelectric stack to a first reference level;

divide the overlap time into first and second time periods as a function of the charge and discharge currents;

apply the charge current to the piezoelectric stack for a charge time calculated on the basis of the first time period of the overlap time; and apply the discharge current to the piezoelectric stack for a discharge time so as to discharge the stack to a second reference level, wherein the discharge time is calculated on the basis of the second time period of the overlap time, such that the first and second injection events are merged in a merging pulse mode of operation.

15. The controller according to claim 14, wherein said circuitry is arranged to select operation in the merging pulse mode depending on the overlap time.

16. The controller according to claim 14, wherein said circuitry is arranged to select operation in the merging pulse mode depending on the required separation time.

17. The controller according to claim 14, wherein said circuitry is arranged to select operation in the merging pulse mode depending on the injector closing time.

18. The controller according to claim 14, wherein the controller operates in an alternative mode when not operating in the merging pulse mode, the controller comprising circuitry arranged to:

apply the charge current to the piezoelectric stack for the time required to charge the injector piezoelectric stack to the first reference level; and apply the discharge current to the piezoelectric stack for the time required to discharge the stack to the second reference level such that the voltage across the stack decreases from a high voltage level to a low voltage level.

19. A computer program on a computer readable memory or storage device for execution by a computer, the computer program comprising a computer program software portion that, when executed, is operable to implement a control method for a fuel injector having a piezoelectric stack that is charged by means of a charge current and discharged by means of a discharge current, the fuel injector, in operation, defining an injector closing time, the implemented method comprising:

determining a required separation time between: (i) a termination of an electrical on signal associated with a first injection event; and (ii) an initiation of an electrical on signal associated with a second injection event;

calculating an overlap time between the required separation time and the time required to charge the piezoelectric stack to a first reference level using the charge current;

dividing the overlap time into first and second time periods as a function of the charge and discharge currents;

applying the charge current to the piezoelectric stack for a charge time calculated on the basis of the first time period of the overlap time; and applying the discharge current to the piezoelectric stack for a discharge time so as to discharge the stack to a second reference level, wherein the discharge time is calculated on the basis of the second time period of the overlap time, such that the first and second injection events are merged in a merging pulse mode of operation.

* * * * *